United States Patent
Yoo (10) Patent No.: US 12,340,171 B2
(45) Date of Patent: Jun. 24, 2025

(54) METHOD OF IMPROVING PERFORMANCE OF MATHEMATICS-RELATED ARTIFICIAL INTELLIGENCE MODEL AND EXPANDING EASE OF SEARCH USING MATHEMATICAL READING TECHNOLOGY

(71) Applicant: ITEXSOLUTION.INC, Seoul (KR)

(72) Inventor: Wang Sang Yoo, Seoul (KR)

(73) Assignee: ITEXSOLUTION.INC (KR)

( * ) Notice: Subject to any disclaimer, the term of this patent is extended or adjusted under 35 U.S.C. 154(b) by 0 days.

(21) Appl. No.: 17/926,417

(22) PCT Filed: Nov. 2, 2022

(86) PCT No.: PCT/KR2022/017039
§ 371 (c)(1),
(2) Date: Nov. 18, 2022

(87) PCT Pub. No.: WO2023/182605
PCT Pub. Date: Sep. 28, 2023

(65) Prior Publication Data
US 2024/0232524 A1    Jul. 11, 2024

(30) Foreign Application Priority Data
Mar. 25, 2022 (KR) .................. 10-2022-0037433

(51) Int. Cl.
  *G06F 40/20*  (2020.01)
  *G06F 17/11*  (2006.01)
  *G06F 40/103* (2020.01)
(52) U.S. Cl.
  CPC .............. *G06F 40/20* (2020.01); *G06F 17/11* (2013.01); *G06F 40/103* (2020.01)

(58) Field of Classification Search
  CPC ........ G06F 40/20; G06F 17/11; G06F 40/103; G06F 16/332; G06F 16/338; G06F 16/432; G06F 17/28; G06F 17/289; G06F 40/111; G06F 40/56; G10L 13/08; G06N 3/08
  See application file for complete search history.

(56) References Cited

U.S. PATENT DOCUMENTS

| 2007/0219933 | A1* | 9/2007 | Datig ................. G06F 40/35 706/4 |
| 2013/0275122 | A1* | 10/2013 | Park .................. G06F 40/211 704/9 |
| 2018/0089177 | A1* | 3/2018 | Cho .................. G06F 16/3344 |
| 2020/0043464 | A1* | 2/2020 | Chae .................. G06N 3/08 |
| 2021/0358473 | A1* | 11/2021 | Chae .................. G10L 13/08 |

FOREIGN PATENT DOCUMENTS

WO    WO-0193076 A2 * 12/2001 ......... G06F 17/2715

* cited by examiner

*Primary Examiner* — Yogeshkumar Patel
(74) *Attorney, Agent, or Firm* — J. Clinton Wimbish; Maynard Nexsen PC (57) ABSTRACT

A method of training, by a terminal, a mathematics-related artificial intelligence (AI) model, includes collecting mathematical words for training the mathematics-related AI model, converting the mathematical words into a reading sentence by using a mathematical reading technology, generating learning data for training the mathematics-related AI model based on the reading sentence, and training the mathematics-related AI model by using the learning data. The mathematical words may include a natural language part and a mathematical part.

6 Claims, 4 Drawing Sheets

METHOD OF IMPROVING PERFORMANCE OF MATHEMATICS-RELATED ARTIFICIAL INTELLIGENCE MODEL AND EXPANDING EASE OF SEARCH USING MATHEMATICAL READING TECHNOLOGY

This application is a U.S. National Phase of PCT/KR2022/017039, filed Nov. 2, 2022, which claims priority to Korean patent application no. 10-2022-0037433, filed Mar. 25, 2022, each of which is incorporated herein by reference in its entirety.

BACKGROUND

1. Technical Field

The specification relates to a method of learning a mathematical equation by converting the mathematical equation into a "mathematical reading" format based on a natural language in order to solve a problem with degraded learning performance of artificial intelligence (AI) which occurs due to a complicated mathematical equation having a grammatical structure different from that of a natural language in the development of a mathematics-related AI model and an apparatus therefor.

2. Related Art

First, a mathematical reading technology is a technology that was specially developed in order to read a mathematical equation, among functions of a screen reader (e.g., a screen reading program) that reads text for the blind.

Furthermore, a method of storing a mathematical equation as data basically includes two methods. The two methods include the Tex grammar that is used in a TeX typewriting program invented by Professor Donald E. Knuth in 1978 and MathML, that is, a web standard. MathML is complicated to the extent that a person cannot understand and input the XML grammar of MathML in the nature of the XML grammar, and is basically input and stored based on the Tex grammar.

SUMMARY

Various embodiments are directed to proposing a method of training an AI model by converting a mathematical equation grammar into reading similar to a natural language.

Various embodiments are directed to proposing a method of facilitating search for text and a voice by storing mathematical reading data as data for an equation and then enabling the data to be directly exposed to search.

Technical objects to be achieved by this specification are not limited to the aforementioned object, and the other objects not described above may be evidently understood from the following detailed description of the specification by a person having ordinary knowledge in the art to which this specification pertains.

In an embodiment, a method of training, by a terminal, a mathematics-related artificial intelligence (AI) model, includes collecting mathematical words for training the mathematics-related AI model, converting the mathematical words into a reading sentence by using a mathematical reading technology, generating learning data for training the mathematics-related AI model based on the reading sentence, and training the mathematics-related AI model by using the learning data. The mathematical words may include a natural language part and a mathematical part.

Furthermore, in the learning data, the start and end of the reading sentence indicative of the mathematical part may be distinguished from each other based on a flag.

Furthermore, the mathematics-related AI model may be previously trained based on a natural language.

Furthermore, the method may further include receiving, from a user, a search command for searching for the mathematical words, and searching for mathematical words corresponding to the search command through a server for searching for the mathematical words.

Furthermore, the search command may include information that represents the mathematical words in a natural language format.

Furthermore, the server for searching for the mathematical words may include storage data which is a target of search for the mathematical words. The storage data may include (1) a first part to be output to a screen of the terminal and (2) a second part for searching for the mathematical words, which indicate the mathematical part.

Furthermore, the second part may be obtained by converting the mathematical part into the reading sentence by using the mathematical reading technology.

In another embodiment, a terminal that trains a mathematics-related artificial intelligence (AI) model includes memory including a mathematics-related AI model and a processor configured to functionally control the memory. The processor may collect mathematical words for training the mathematics-related AI model, may convert the mathematical words into a reading sentence by using a mathematical reading technology, may generate learning data for training the mathematics-related AI model based on the reading sentence, and may train the mathematics-related AI model by using the learning data. The mathematical words may include a natural language part and a mathematical part.

According to an embodiment of this specification, an AI model can be efficiently trained by converting a mathematical equation grammar into reading similar to a natural language.

Furthermore, according to an embodiment of this specification, search for text and a voice can be facilitated by storing mathematical reading data as data for an equation and then enabling the data to be directly exposed to search.

Effects which may be obtained in this specification are not limited to the aforementioned effects, and other effects not described above may be evidently understood by a person in the art to which this having ordinary knowledge specification pertains from the following description.

The accompany drawings, which are included as part of the detailed description in order to help understanding of this specification, provide embodiments of this specification and describe the technical characteristics of this specification along with the detailed description.

DETAILED DESCRIPTION

Hereinafter, embodiments disclosed in this specification are described in detail with reference to the accompanying drawings. The same or similar element is assigned the same reference numeral regardless of its reference numeral, and a redundant description thereof is omitted. It is to be noted that the suffixes of elements used in the following description, such as a "module" and a "unit", are assigned or interchangeable with each other by taking into consideration only the ease of writing this specification, but in themselves are not particularly given distinct meanings and roles. Furthermore, in describing an embodiment disclosed in this specification, when it is determined that a detailed description of a related known technology may obscure the subject matter of an embodiment disclosed in this specification, the detailed description will be omitted. Furthermore, it is to be understood that the accompanying drawings are merely intended to make easily understood the embodiments disclosed in this specification, and the technical spirit disclosed in this specification is not restricted by the accompanying drawings and includes all changes, equivalents, and substitutions which fall within the spirit and technical scope of this specification.

Terms including ordinal numbers, such as a "first" and a "second", may be used to describe various components, but the components are not restricted by the terms. The terms are used to only distinguish one element from the other elements.

When it is said that one element is "connected" or "coupled" to another element, it should be understood that one element may be directly connected or coupled to another element, but a third element may exist between the two elements. In contrast, when it is described that one element is "directly connected to" or "directly coupled to" the other element, it should be understood that a third element does not exist between the two elements.

An expression of the singular number includes an expression of the plural number unless clearly defined otherwise in the context.

In this specification, it is to be understood that a term, such as "include" or "have", is intended to designate that a characteristic, a number, a step, an operation, a element, a part or a combination of them described in the specification is present, and does not exclude the presence or addition possibility of one or more other characteristics, numbers, steps, operations, elements, parts, or combinations of them in advance.

Figure 1:
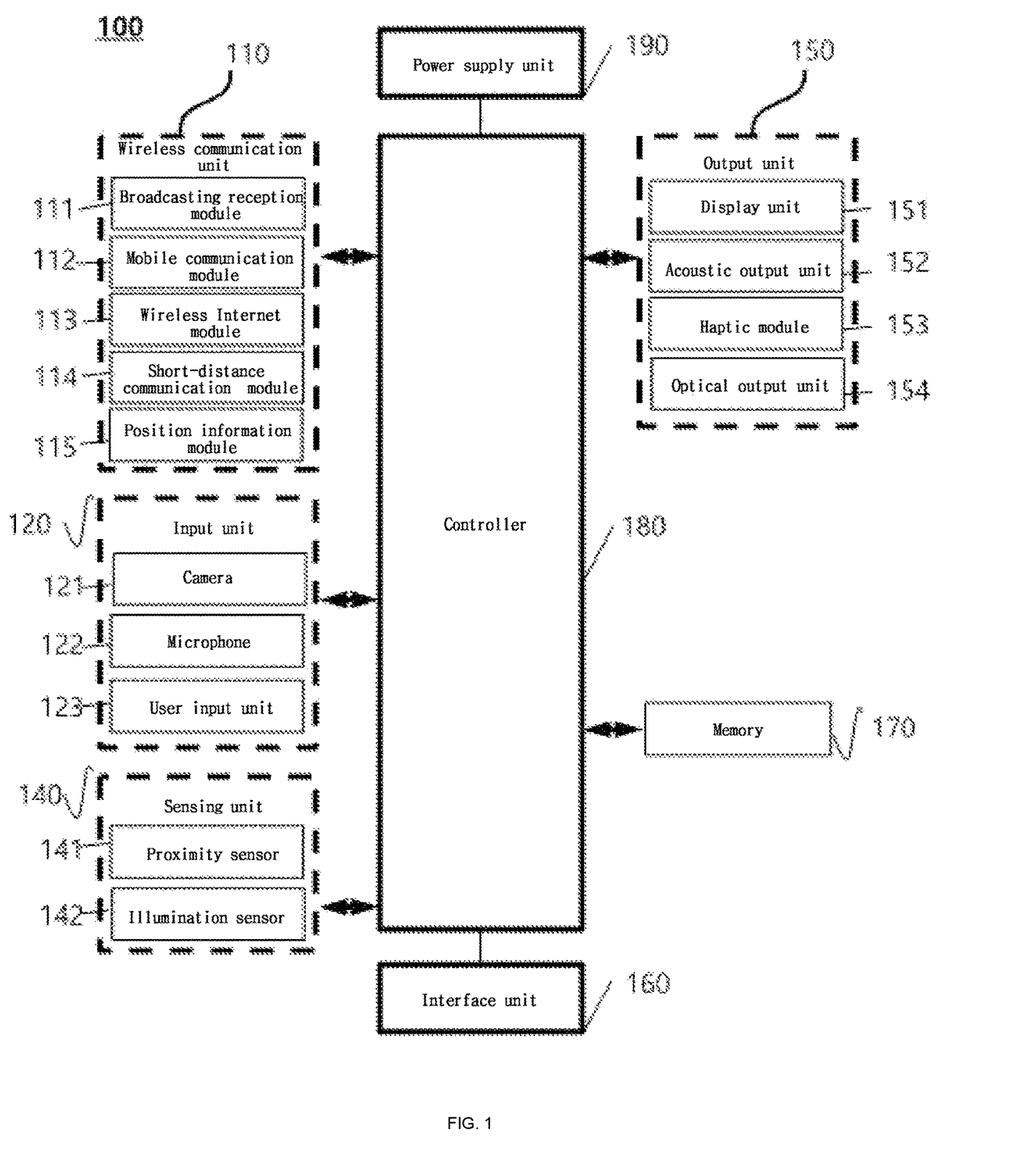
FIG. 1 is a block diagram for describing an electronic device related to this specification.

FIG. 1 is a block diagram for describing an electronic device related to this specification.

An electronic device 100 may include a wireless communication unit 110, an input unit 120, a sensing unit 140, an output unit 150, an interface unit 160, memory 170, a controller 180, a power supply unit 190, etc. The components illustrated in FIG. 1 are not essential in implementing the electronic device. The electronic device described in this specification may have more or less components than the components listed above.

More specifically, among the components, the wireless communication unit 110 may include one or more modules that enable wireless communication between the electronic device 100 and a wireless communication system, between the electronic device 100 and another electronic device 100, or between the electronic device 100 and an external server. Furthermore, the wireless communication unit 110 may include one or more modules that connect the electronic device 100 to one or more networks.

The wireless communication unit 110 may include at least one of a broadcasting reception module 111, a mobile communication module 112, a wireless Internet module 113, a short-distance communication module 114, and a position information module 115.

The input unit 120 may include a camera 121 or an image input unit for receiving an image signal, a microphone 122 or an audio input unit for receiving an audio signal, and a user input unit 123 (e.g., a touch key or a mechanical key) for receiving information from a user. Voice data or image data that is collected by the input unit 120 may be analyzed and processed as a control command of the user.

The sensing unit 140 may include one or more sensors for sensing at least one of information within the electronic device, surrounding environment information around the electronic device, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, for example, a camera (refer to 121), a microphone (refer to 122), a battery gauge, an environment sensor (e.g., a barometer, a hygrometer, a thermometer, a radioactivity sensor, a thermal sensor, or a gas sensor), a chemical 1 sensor (e.g., an electronic nose, a healthcare sensor, a bio recognition sensor). The electronic device disclosed in this specification may combine and use pieces of information that are sensed by at least two of these sensors.

The output unit 150 is for generating an output related to a visual, auditory, or tactile sense, and may include at least one of a display unit 151, an acoustic output unit 152, a haptic module 153, and an optical output unit 154. The display unit 151 may implement a touch screen by forming a mutual layer structure along with a touch sensor or being integrally formed along with a touch sensor. The touch screen may function as the user input unit 123 that provides an input interface between the electronic device 100 and a user, and may also provide an output interface between the electronic device 100 and a user.

The interface unit 160 may serve as a passage with various types of external devices that are connected to the electronic device 100. The interface unit 160 may include at least one of a wired/wireless headset port, an external charger port, a wired/wireless data port, a memory card port, a port that connects a device equipped with an identification module, an audio input/output (I/O) port, a video I/O port, and an earphone port. The electronic device 100 may perform proper control related to an external device connected thereto, in response to the connection of the external device with the interface unit 160.

Furthermore, the memory 170 may store data that supports various functions of the electronic device 100. The memory 170 may store multiple application programs or applications that are driven in the electronic device 100, data for an operation of the electronic device 100, and instructions. At least some of the application programs may be downloaded from an external server through wireless communication. Furthermore, at least some of the application programs may be present on the electronic device 100 from the time of release for basic functions (e.g., call incoming and outgoing functions and message reception and sending functions) of the electronic device 100. The application program may be stored in the memory 170, may be installed in the electronic device 100, and may be driven to perform an operation (or function) of the electronic device by the controller 180.

The controller 180 commonly controls an overall operation of the electronic device 100 in addition to an operation related to the application program. The controller 180 may provide information or a function suitable for a user or process the information or function by processing a signal, data, or information that is input or output through the aforementioned components or driving an application program stored in the memory 170.

Furthermore, the controller 180 may control at least some of the components that have been described with reference to FIG. 1 in order to drive an application program stored in the memory 170. Moreover, the controller 180 may combine and operate at least t two of the components included in the electronic device 100 in order order to drive the application program.

The power supply unit 190 may be supplied with external power and internal power under the control of the controller 180, and may supply power to each of the components included in the electronic device 100. The power supply unit 190 includes a battery. The battery may be an embedded type battery or a replaceable type battery.

At least some of the components may cooperatively operate in order to implement an operation, control, or a control method of the electronic device according to various embodiments described hereinafter. Furthermore, the operation, control, or control method of the electronic device may be implemented on the electronic device by the driving of at least one application program stored in the memory 170.

In this specification, the electronic device 100 may be commonly called a terminal.

Figure 2:
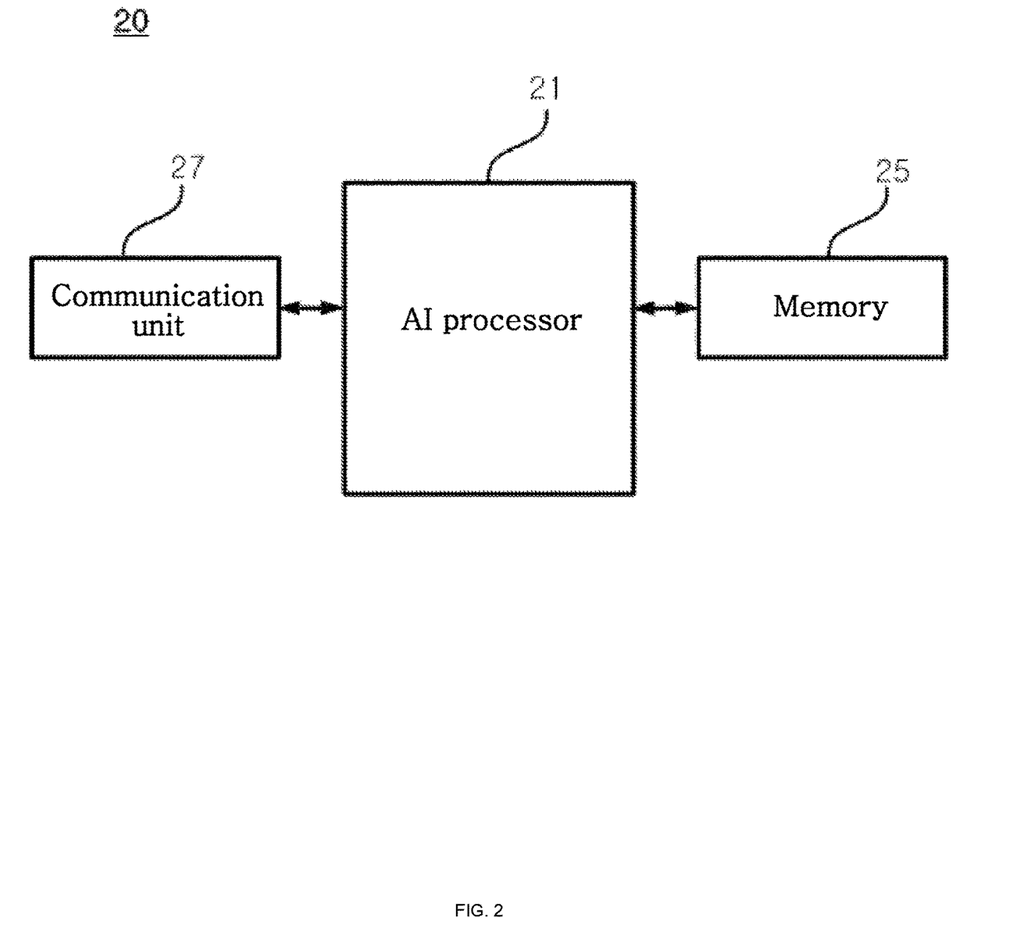
FIG. 2 is a block diagram of an AI device according to an embodiment of this specification.

FIG. 2 is a block diagram of an artificial intelligence (AI) device according to an embodiment of this specification.

An AI device 20 may include an electronic device including an AI module capable of performing AI processing, a server including the AI module. Furthermore, the AI device 20 may be included as at least some component of the electronic device 100 illustrated in FIG. 1, and may be provided to perform at least some of AI processing.

The AI device 20 may include an AI processor 21, memory 25 and/or a communication unit 27.

The AI device 20 is a computing device capable of learning a neural network, and may be implemented as various electronic devices, such as a server, a desktop PC, a notebook PC, and a tablet PC.

The AI processor 21 may learn a neural network by using a program stored in the memory 25. In particular, the AI processor 21 may generate AI models for providing various mathematics-related services, such as the classification of a mathematical problem and the solving of a mathematical word problem.

The AI processor 21 that performs the aforementioned function may be a general purpose processor (e.g., a CPU), but may be an AI-dedicated processor (e.g., a graphics processing unit (GPU)) for AI learning.

The memory 25 may store various types of programs and data necessary for an operation of the AI device 20. The memory 25 may be implemented as nonvolatile memory, volatile memory, flash memory, a hard disk drive (HDD), or a solid state drive (SDD). The memory 25 is accessed by the AI processor 21. The reading/recording/modification/deletion/update of data in the memory 25 may be performed by the AI processor 21. Furthermore, the memory 25 may store a neural network model (e.g., a deep learning model) that is generated through a learning algorithm for data classification/recognition according to an embodiment of this specification.

The AI processor 21 may include a data learning unit that learns a neural network for data classification/recognition. For example, the data learning unit may train a deep learning model by obtaining learning data to be used for learning and applying the obtained learning data to the deep learning model.

The communication unit 27 may transmit AI processing results by the AI processor 21 to an external electronic device.

In this case, the external electronic device may include another terminal or a server.

The AI device 20 illustrated in FIG. 2 has been described by being functionally divided into the AI processor 21, the memory 25, and the communication unit 27, but the aforementioned components may be integrated into one module and called an AI module or an AI model.

Figure 3:
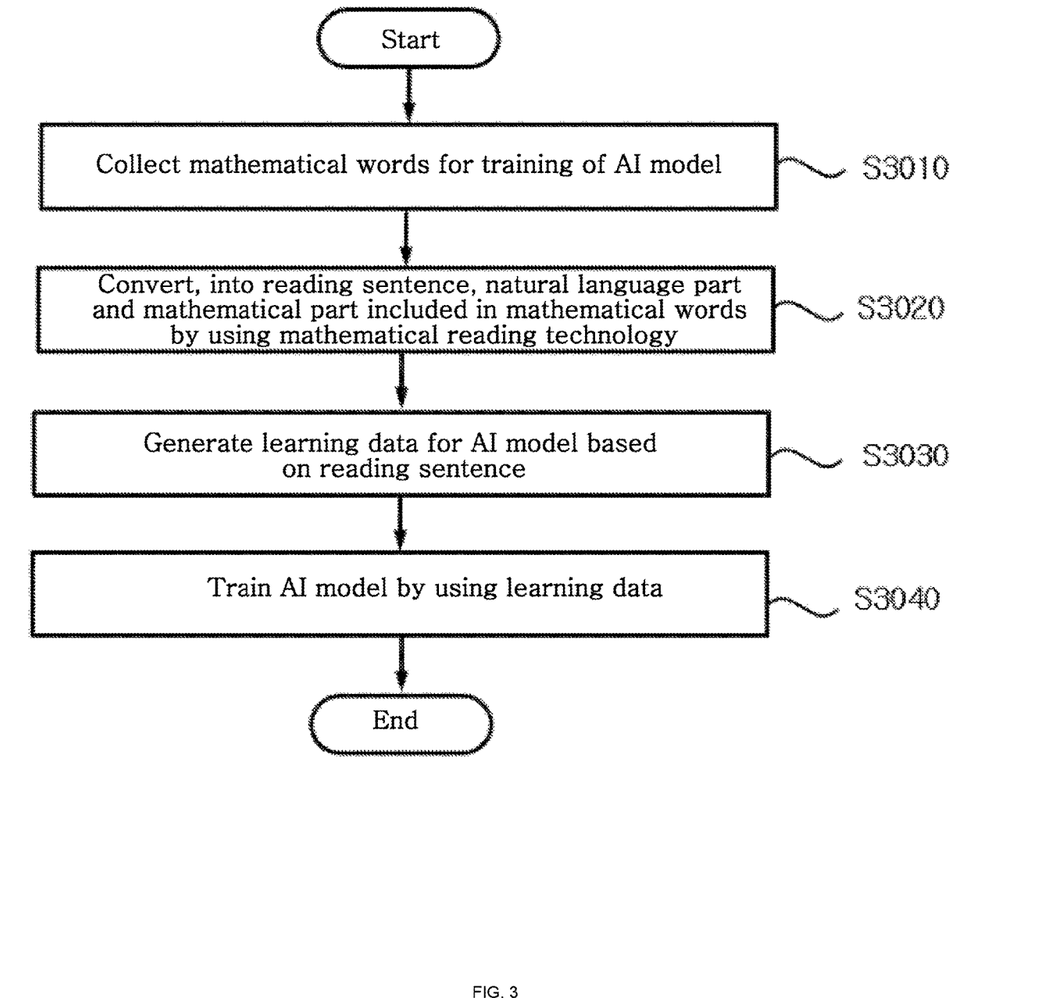
FIG. 3 is an example of a learning method which may be applied to this specification.

FIG. 3 is an example of a learning method which may be applied to this specification.

In general, when an AI model for classifying mathematical problems or solving a problem is implemented, required learning data may be constituted with a natural language+mathematical equation grammar, and may be input to the AI model.

Table 1 is an example of learning data that is constituted with mathematical words (natural language+mathematical equation grammar).

TABLE 1

| (1) | "이차방정식 $x^2 - 3x + \frac{1}{2} = 0$ 을 푸시오." |
| (2) | "Solve the quadratic equation: $x^2 - 3x + \frac{1}{2} = 0$." |

A common AI model may learn a mathematical equation by translating the mathematical equation into a text sentence by using the TeX grammar. Referring to Table 1, learning data (1) may be translated into "이차방정식 $x^2-3x+\frac{1}{2}=0$을 푸시오.", and learning data (2) may be translated into "Solve the quadratic equation: $x^2-3x+\frac{1}{2}=0$".

Thereafter, the AI model may be trained by separating the text sentence into natural languages, such as "the quadratic equation", "을", "푸시오." or "Solve", "the", "quadratic", and "equation", and a token indicative of the mathematical equation "$x^2-3x+\frac{1}{2}=0$".

In this case, the recognition of the natural languages may expect better performance with only some additional learning based on a large amount of pre-trained models. However, most of mathematical equation grammars are excluded from the learning of the natural languages. Accordingly, the balance of sentence understanding may generally collapse because it is not easy to expect a learning model that entirely understands the mathematical words.

Referring to FIG. 3, a terminal may produce learning data by converting mathematical words into a complete sentence having a natural language format by using a mathematical reading technology.

The terminal collects mathematical words for the training of an AI model (S3010). For example, the mathematical words may be randomly collected through the Internet or over a network or may be input by a user, and may include a natural language part and a mathematical part.

The terminal converts, into a reading sentence, the natural language part and the mathematical part that are included in the mathematical words by using the mathematical reading technology (S3020). For example, the terminal may convert the mathematical words "the quadratic equation $$x^2 - 3x + \frac{1}{2} = 0.$$

into a reading sentence "Solve the quadratic equation: $x squared minus 3 x plus one half equals 0$". The reading sentence may be regularly generated by a preset algorithm by using the mathematical reading technology.

For example, the mathematical reading technology may be implemented through open sources (e.g., Speech-Rule-Engine, SRE, https://github.com/Speech-Rule-Engine/speech-rule-engine).

The terminal may generate learning data for the AI model based on the reading sentence (S3030). For example, the start and end of the reading sentence indicative of a mathematical equation in the learning data may be divided as one token based on a flag, such as $. Accordingly, the preset algorithm enables the AI model to learn the mathematical equation the start and end of which have been divided.

Table 2 is an example of learning data to which this specification may be applied.

TABLE 2

(1) "이차방정식 $x 의 제곱 빼기 3x 더하기 2 분의 1 은 0 $을 푸시오."
(2) "Solve the quadratic equation: $x squared minus 3 × plus one half equals 0$"

Table 2 exemplifies learning data that has been generated as the mathematical words of Table 1. The terminal trains the AI model by using the learning data (S3040).

The AI model that has learnt the sentence processed to have the natural language format as described above may be expected to obtain higher performance by sufficiently using performance of an AI model based on a natural language, which has been conventionally researched. That is, the AI model of the terminal may be an AI model that is trained based on a natural language. Performance of the AI model can be improved through the aforementioned learning method.

More specifically, an AI model for solving a mathematical word problem, which has formats that do not include an equation grammar of merely the four fundamental arithmetic operations, currently has reached a level in which the AI model autonomously solves a problem through machine learning.

For example, problems, such as "Find the volume of a rectangular parallelepiped when the width, length, and height of the rectangular parallelepiped are 2 m, 3 m, and 5 m, respectively.", may be solved and the results thereof may be obtained through the learning of an AI model.

However, if a complicated mathematical equation grammar is included, performance of an AI model may be suddenly degraded. The generation of learning data based on the conversion of the mathematical reading and AI learning using the same are constructed in a format close to a natural language that is learnt by a person, not a complicated mathematical equation grammatical structure, so that better learning results can be expected compared to a conventional technology.

Furthermore, if performance of the solving of a mathematical word problem is improved, this means that an AI model can understand the meaning of a question in depth. The AI model can perform search more accurately and with more sub-divided contents beyond the existing simple similarity search level even, in classifying mathematical problems or finding a similar question.

For example, if a terminal classifies mathematical words (1) "Solve a quadratic equation $x^2-3x+2=0$." and (2) "Solve a quadratic equation $x^2-3x+4=0$.", (1) the mathematical words may be classified as an equation problem in the middle school course because a value of x is a real number, but (2) the mathematical words may be classified as an equation problem in a high school course because a value of x is an imaginary number. Accordingly, if performance of the solving of a mathematical problem having a sentence format in a mathematics-related AI model is improved, as in the aforementioned case, the terminal may classify problems more accurately based on an obtained answer through the solving of a mathematical equation.

Furthermore, the aforementioned learning method may be used in all language areas in which equation reading can be processed.

Figure 4:
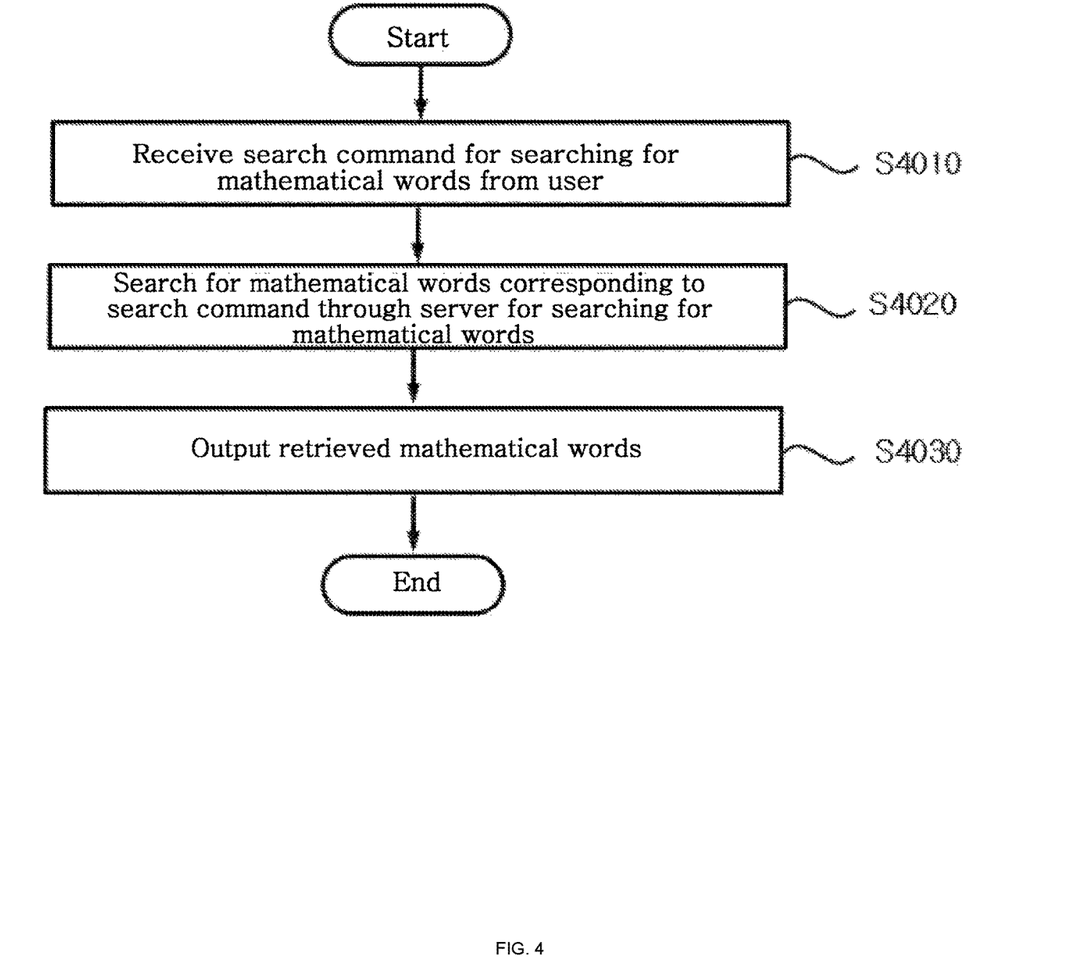
FIG. 4 is a search method of a terminal to which this specification may be applied.

FIG. 4 is a search method of a terminal to which this specification may be applied.

The Tex grammar for the datafication of a mathematical equation imitates the writing of a mathematical equation into a natural language that is read by a person, but represents the mathematical equation in a fully different format. Accordingly, it is not easy to search a web for a desired mathematical equation.

Table 3 is an example of storage data of mathematical words to which this specification may be applied.

TABLE 3

| Classification | Form |
|---|---|
| Screen display | "이차방정식 $x^2 - 3x + \frac{1}{2} = 0$ 을 푸시오." |
| Storage data | (1) "이차방정식 $x^2 -3x+\frac{1}{2} =0$을 푸시오." |
| | (2) "이차방정식 <math xmlns = "http://www.w3.org/1998/Math/MathML" display="block"> <mrow> <mrow> <msup> <mi>x</mi> <mn>2</mn> </msup><mo> − </mo><mrow><mn>3</mn><mo> ⁢ |

TABLE 3-continued

| Classification | Form |
|---|---|
| | </mo><mi>x</mi></mrow></mrow><mo>+</mo><mfrac><mn>1</mn><mn>2</mn></mfrac></mrow><mo>=</mo><mn>0</mn></math>을 푸시오." |

Referring to Table 3, mathematical words having a data format that is displayed on a screen on the web will be stored in a server in the form of (1) or (2). Accordingly, it is not easy to search a database structure having such storage data for targeted mathematical words through text or voice command. A mathematical equation that is input based on the TeX grammar or MathML has been converted and output through a separate converter, if necessary, because mathematical reading will have been used as for only an auxiliary tool for the blind. In this specification, a terminal can easily search text and a voice by converting a mathematical equation into mathematical sentence storage data having a new format by using the mathematical reading technology, storing the mathematical sentence storage data, and then enabling the mathematical sentence storage data to be directly exposed to search.

Referring to FIG. 4, a terminal receives a search command for searching for mathematical words from a user (S4010). For example, the user may input the search command, including a sentence including a mathematical equation, to the terminal in a natural language format through an input window on a screen or a voice command. More specifically, the user may instruct the terminal to search for mathematical words through a search command having a meaning "Solve the quadratic equation: x squared minus 3x plus one half equals 0".

The terminal searches for mathematical words corresponding to the search command through a server for searching for the mathematical words (S4020). For example, the terminal may search for mathematical words including results having the highest similarity through similarity search between mathematical words that are included in the input search command and storage data of the server for searching for the mathematical words.

The server includes a database for which the mathematical words will be searched. The database may include storage data having a mathematical reading data format as the target of search for the mathematical words. To this end, the terminal for generating the storage data may collect original mathematical word data (e.g., "Solve the quadratic equation $$x^2 - 3x + \frac{1}{2} = 0.$$

may convert the original mathematical word data into a format having the Tex grammar (e.g., "Solve the quadratic equation $x^2-3x+\frac{1}{2}=0$."), may convert the format having the Tex grammar into TeX reading again, and may generate storage data (e.g., "Solve the quadratic equation <mathspeech data-view="x^2-3x+\frac{1}{2}=0" data-search="x squared minus 3x plus one half equals 0"/>."), and may include the storage data in the server. To this end, the terminal for generating the storage data may use the learning method illustrated in FIG. 3.

More specifically, the storage data may include a part (data-view) that has been represented based on the Tex grammar and a part (data-search) that has been converted into reading for search. The terminal may search for the mathematical words by comparing the part that has been converted into reading and the search command.

The terminal outputs the retrieved mathematical words (S4030). For example, the terminal may render the mathematical equation by using TeX or MathML information (e.g., the data-view part) that has been stored as meta information instead of the part that has been converted into reading, and may display the rendered mathematical equation on a screen.

More specifically, if the output mathematical words are storage data indicating "Solve the quadratic equation <mathspeech data-view="x^2-3x+\frac{1}{2}=0" data-search="x squared minus 3x plus one half equals 0"/>.", the terminal may display "Solve the quadratic equation $$x^2 - 3x + \frac{1}{2} = 0."$$

on a screen, and may output a voice indicating "Solve the quadratic equation x squared minus 3x plus one half equals 0" through a speaker.

That is, the storage data may include (1) a first part to be output to a screen of the terminal and (2) a second part for searching for the mathematical words.

The aforementioned present disclosure may be implemented in a medium on which a program has been recorded as a computer-readable code. The computer-readable medium includes all types of recording media in which data readable by a computer system is stored. Examples of the computer-readable medium include a hard disk drive (HDD), a solid state disk (SDD), a silicon disk drive (SDD), ROM, RAM, CD-ROM, a magnetic tape, a floppy disk, an optical data storage device, and also include an implementation having the form of carrier waves (e.g., transmission through the Internet). Accordingly, the detailed description should not be construed as being limitative, but should be considered to be illustrative from all aspects. The scope of the present disclosure should be determined by reasonable analysis of the attached claims, and all changes within the equivalent scope of the present disclosure are included in the scope of the present disclosure.

Furthermore, although the services and embodiments have been chiefly described, they are only illustrative and are not intended to limit the present disclosure. A person having ordinary knowledge in the art to which the present disclosure pertains may understand that various modifications and applications not illustrated above are possible without departing from the essential characteristics of the present services and embodiments. For example, each of the elements described in the embodiments may be modified and implemented. Furthermore, differences related to such modifications and applications should be construed as belonging to the scope of the present disclosure defined in the appended claims.

What is claimed is:

1. A method of training, by a terminal, a mathematics-related artificial intelligence (AI) model, the method comprising:

collecting mathematical words for training the mathematics-related AI model;
converting the mathematical words into a reading sentence by using a mathematical reading technology;
generating learning data for training the mathematics-related AI model based on the reading sentence; and
training the mathematics-related AI model by using the learning data,
wherein the mathematical words comprise a natural language part and a mathematical part,
wherein the reading sentence comprises:
1) a pure natural language part converted from the natural language part, and
2) a formula natural language part converted from the mathematical expression part,
wherein the learning data, distinguishes a start and an end of the formula natural language part from the pure natural language part by using a flag,
wherein the mathematics-related AI model is previously trained based on a natural language, and
wherein the mathematics-related AI model separates and trains the formula natural language part and the pure natural language part based on the learning data.

2. The method of claim 1, further comprising:
receiving, from a user, a search command for searching for the mathematical words; and
searching for mathematical words corresponding to the search command through a server for searching for the mathematical words.

3. The method of claim 2, wherein the search command comprises information that represents the mathematical words in a natural language format.

4. The method of claim 3, wherein:
the server for searching for the mathematical words comprises storage data which is a target of search for the mathematical words, and
the storage data comprises (1) a first part to be output to a screen of the terminal and (2) a second part for searching for the mathematical words, which indicate the mathematical part.

5. The method of claim 4, wherein the second part is obtained by converting the mathematical part into the reading sentence by using the mathematical reading technology.

6. A terminal that trains a mathematics-related artificial intelligence (AI) model, comprising:
memory comprising a mathematics-related AI model; and
a processor configured to functionally control the memory,
wherein the processor is configured to:
collect mathematical words for training the mathematics-related AI model,
convert the mathematical words into a reading sentence by using a mathematical reading technology,
generate learning data for training the mathematics-related AI model based on the reading sentence, and
train the mathematics-related AI model by using the learning data,
wherein the mathematical words comprise a natural language part and a mathematical part,
wherein the reading sentence comprises:
1) a pure natural language part converted from the natural language part, and
2) a formula natural language part converted from the mathematical expression part,
wherein the learning data, distinguishes a start and an end of the formula natural language part from the pure natural language part by using a flag,
wherein the mathematics-related AI model is previously trained based on a natural language, and
wherein the mathematics-related AI model separates and trains the formula natural language part and the pure natural language part based on the learning data.

* * * * *